(12) United States Patent
Kim

(10) Patent No.: US 11,975,798 B2
(45) Date of Patent: May 7, 2024

(54) BICYCLE CRANK ARM COUPLING ASSISTANCE DEVICE

(71) Applicant: Tae Yang Kim, Seoul (KR)

(72) Inventor: Tae Yang Kim, Seoul (KR)

( * ) Notice: Subject to any disclaimer, the term of this patent is extended or adjusted under 35 U.S.C. 154(b) by 348 days.

(21) Appl. No.: 17/628,907

(22) PCT Filed: Jun. 10, 2020

(86) PCT No.: PCT/KR2020/007495
§ 371 (c)(1),
(2) Date: Jan. 21, 2022

(87) PCT Pub. No.: WO2021/015412
PCT Pub. Date: Jan. 28, 2021

(65) Prior Publication Data
US 2022/0315162 A1   Oct. 6, 2022

(30) Foreign Application Priority Data
Jul. 24, 2019   (KR) .................. 10-2019-0089524

(51) Int. Cl.
*B62M 3/00*   (2006.01)
*F16B 5/02*   (2006.01)

(52) U.S. Cl.
CPC ............... *B62M 3/00* (2013.01); *F16B 5/02* (2013.01)

(58) Field of Classification Search
CPC .................................. B62M 3/00; F16B 5/02
See application file for complete search history.

(56) References Cited

U.S. PATENT DOCUMENTS

| | | | |
|---|---|---|---|
| 5,161,430 A * | 11/1992 | Febey | B62M 3/02 74/594.1 |
| 5,421,180 A * | 6/1995 | Rojdev | B25G 1/005 74/528 |
| 5,566,589 A | 10/1996 | Buck | |

FOREIGN PATENT DOCUMENTS

| | | |
|---|---|---|
| JP | 2005-180647 A | 7/2005 |
| KR | 20-1996-0005252 Y1 | 6/1996 |

OTHER PUBLICATIONS

International Search Report mailed Jan. 5, 2021 for PCT/KR2020/007495, citing the above reference(s).

* cited by examiner

*Primary Examiner* — Jason L Vaughan
*Assistant Examiner* — Amanda Kreiling
(74) *Attorney, Agent, or Firm* — CANTOR COLBURN LLP

(57) ABSTRACT

The present invention relates to a coupling-assist device for a bicycle crank arm, comprising: a main body open through upper and lower portions, the main body having a space formed to receive a crank arm to be inserted; a handle member extending from a lower portion of the main body; a support frame including a fixing part formed on a lower portion thereof and coupled with the upper portion of the main body, and a position adjusting hole that is open through to allow a tool to be passed therethrough and connected to the crank arm, wherein the position adjusting hole enables adjustment of position of the tool in up and down directions; and a support means.

6 Claims, 10 Drawing Sheets

BICYCLE CRANK ARM COUPLING ASSISTANCE DEVICE

TECHNICAL HELD

The present invention relates to a coupling-assist device for a bicycle crank arm, and more particularly, to a coupling-assist device for a bicycle crank arm, capable of supporting a crankshaft and a crank arm such that coupling and separation thereof can be easily achieved even with a small force, and also preventing abrasion of a coupling portion between the crankshaft and the crank arm from excessive force.

BACKGROUND ART

In general, bicycles have been mainly used as a means of delivery, transportation, and so on, but recently, the use of bicycles for leisure activities such as mountain driving, cycling competitions, long-distance bicycle trips, and the like is also increasing.

The related bicycle as described above is equipped with a driving device for driving the rear wheel, with the driving device typically formed on the pedal side of the bicycle such that, when force is applied to the pedal, the force is transmitted through the crank arm connected to the pedal to rotate the chain to rotate the rear wheel.

That is, the operation principle of this configuration is that by pushing a pedal coupled with the crank arm with foot allows the crankshaft coupled with the crank arm to be rotated, which in turn causes the rear wheel connected to the crankshaft through the chain to be rotated interlockingly.

At this time, the related crankshaft is simply assembled in the form of being coupled with the coupling hole of the frame, and is formed in a cylindrical shape, so that the crank arm is coupled with both ends of the crankshaft.

However, since the crank arm is configured in a predetermined length that corresponds to the size and purpose of the bicycle, an operator has to exert excessive force while holding the short crank arm during coupling and separating from the crankshaft, and accordingly, there is a problem in that the work of coupling and separating the crank arm is inevitably a very difficult task, and the fatigue of the operator is very severe in spite of the short working time.

SUMMARY

Technical Problem

In order to solve the problems mentioned above, the present invention has been devised in view of the related art described above, and it is an object of the present invention to provide a coupling-assist device for a bicycle crank arm, capable of supporting a crankshaft and a crank arm such that coupling and separation thereof can be easily achieved even with a small force, and also preventing abrasion of a coupling portion between the crankshaft and the crank arm from excessive force.

In addition, it is an object of the present invention to provide a coupling-assist device for a bicycle crank arm, capable of minimizing wear due to friction with a crank arm, as well as enabling long-term use by performing galvanizing on the surface to prevent corrosion.

In addition, it is an object of the present invention to provide a coupling-assist device for a bicycle crank arm, configured to minimize the volume for easy storage when not in use so as to improve portability, and enable easy and simple assembly such that anyone can use it.

Technical Solution

According to an embodiment of the present invention for achieving the above object, the invention includes: a main body open through upper and lower portions, the main body having a space formed to receive a crank arm to be inserted; a handle member extending from a lower portion of the main body; a support frame including a fixing part formed on a lower portion thereof and coupled with the upper portion of the main body, and a position adjusting hole that is open through to allow a tool to be passed therethrough and connected to the crank arm, wherein the position adjusting hole enables adjustment of position of the tool in up and down directions; and a support means including a lower support means passed through the main body and fastened to a lower coupling hole of the crank arm, and an upper support means coupled with the position adjustment hole to adjust the positions of the tool.

According to an embodiment of the present invention, the main body may further include a seating jaw portion to which the fixing part is coupled, a front fastening hole through which the lower support means is passed through, and a rear fastening hole into which an end of the lower support means is inserted and fixed.

According to an embodiment of the present invention, the lower support means may include a fastening head to be coupled with a fastening tool; a screw portion extending from a front end of the fastening head and fastened to a coupling hole of a crank arm while being passed through the front fastening hole; a fixing protrusion protruding from a front end of the screw portion and inserted into and fixed to the rear fastening hole, and a coupling protrusion formed between the fastening head and the screw portion, and fitted into the front fastening hole.

According to an embodiment of the present invention, the upper support means may include a flange head formed at one front end and having a diameter greater than a diameter of the position adjustment hole, for close contact with a front surface of the support frame, a nut fastening part formed on other front end and having a thread formed along an outer circumferential surface, and a fixing nut fastened to the nut fastening part.

According to an embodiment of the present invention, the main body is divided into first and second main bodies, which are coupled to open and close with each other.

According to an embodiment of the present invention, the handle member and the support frame are configured to be placed into the main body.

Advantageous Effects

According to the embodiments of the present invention described above, there is an effect of supporting a crankshaft and a crank arm such that coupling and separation thereof can be easily achieved even with a small force, and also preventing abrasion of a coupling portion between the crankshaft and the crank arm from excessive force.

Further, according to the embodiments of the present invention. In addition, there is an effect of minimizing wear due to friction with a crank arm, as well as enabling long-term use by performing galvanizing on the surface to prevent corrosion.

Further, according to the embodiments of the present invention, there is an effect of providing a configuration to

BEST MODE

Figure 1:
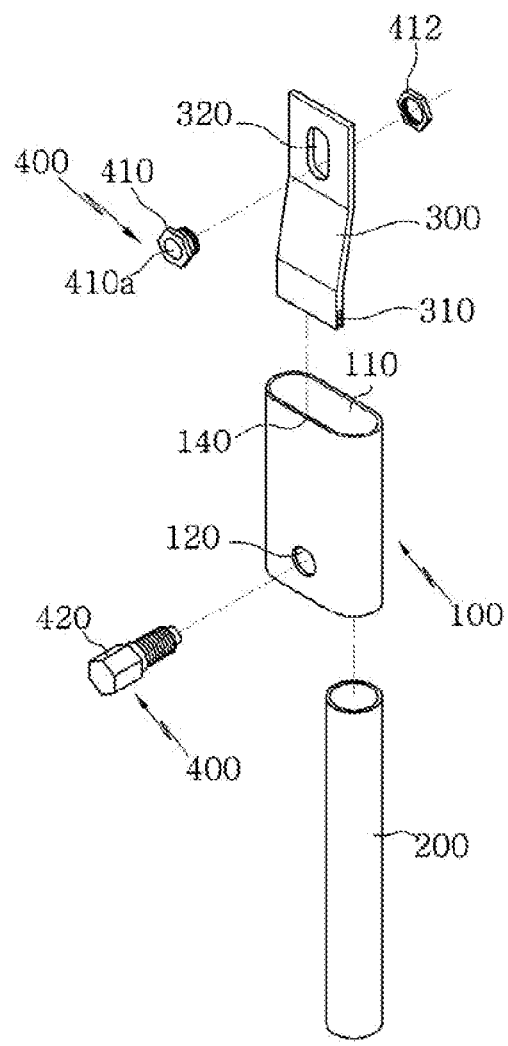
FIGS. 1 and 2 are perspective views of a coupling-assist device for a bicycle crank arm according to an embodiment of the present invention.
Figure 2:
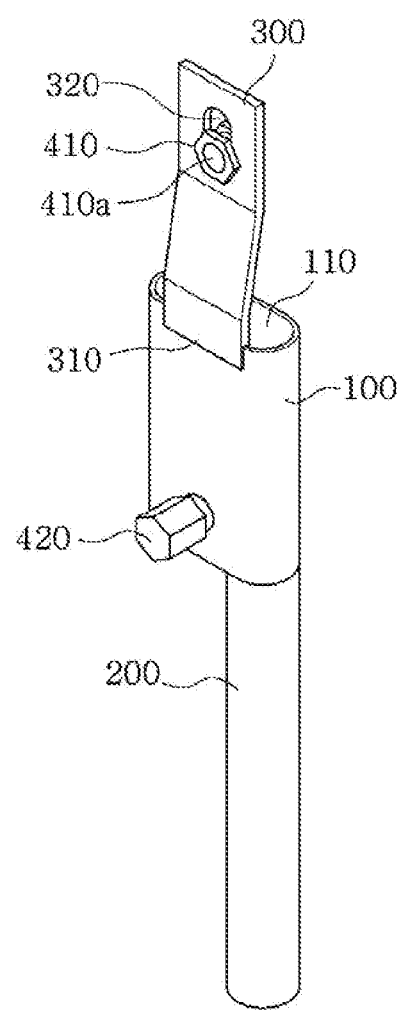
Figure 3:
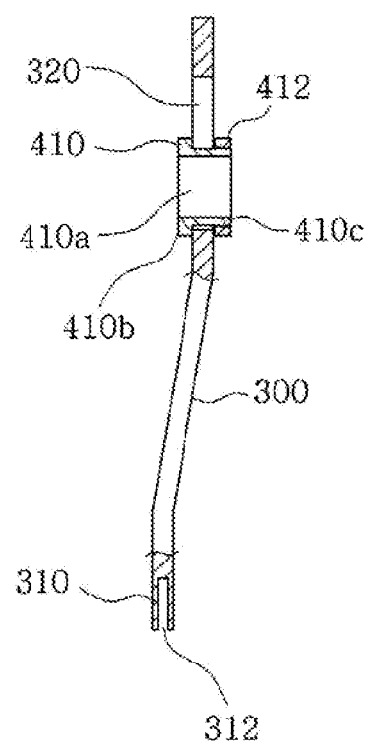
FIG. 3 is a view illustrating a main body of the coupling-assist device for the bicycle crank arm according to an embodiment of the present invention.
Figure 4:
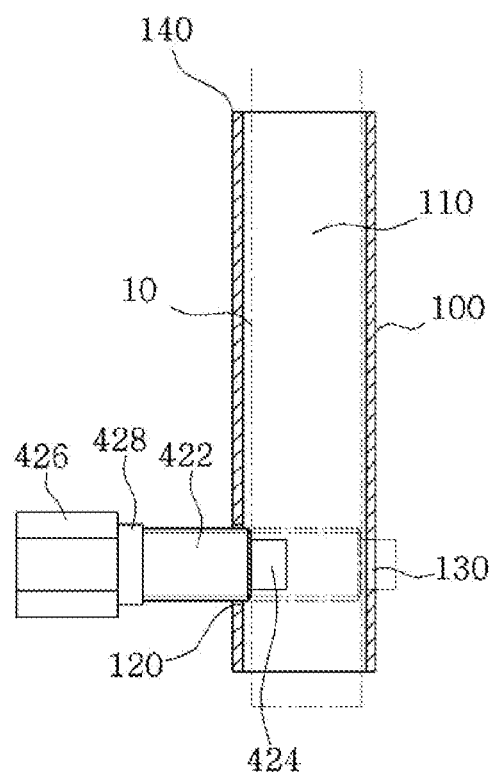
FIG. 4 is a view illustrating a support frame of the coupling-assist device for the bicycle crank arm according to an embodiment of the present invention.
Figure 5:
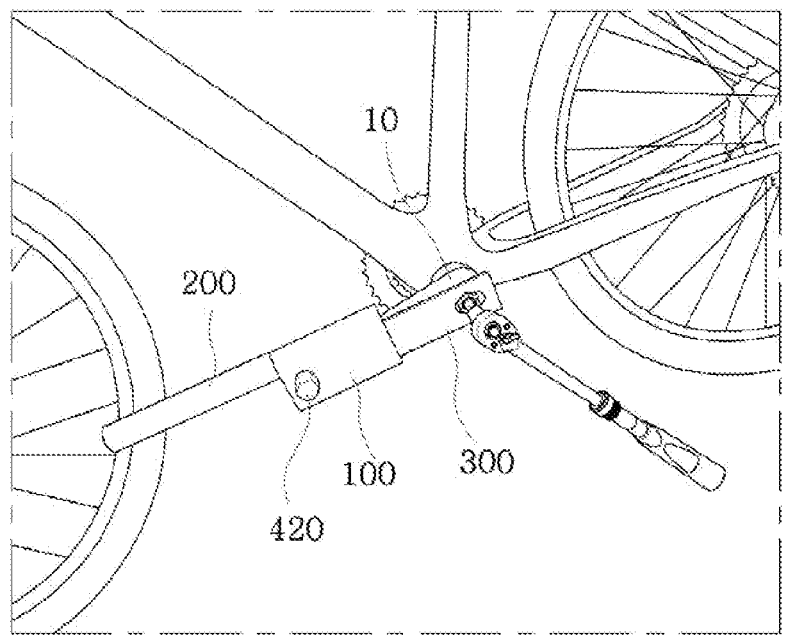
FIGS. 5 and 6 are views illustrating the coupling-assist device for the bicycle crank arm in use according to an embodiment of the present invention.
Figure 6:
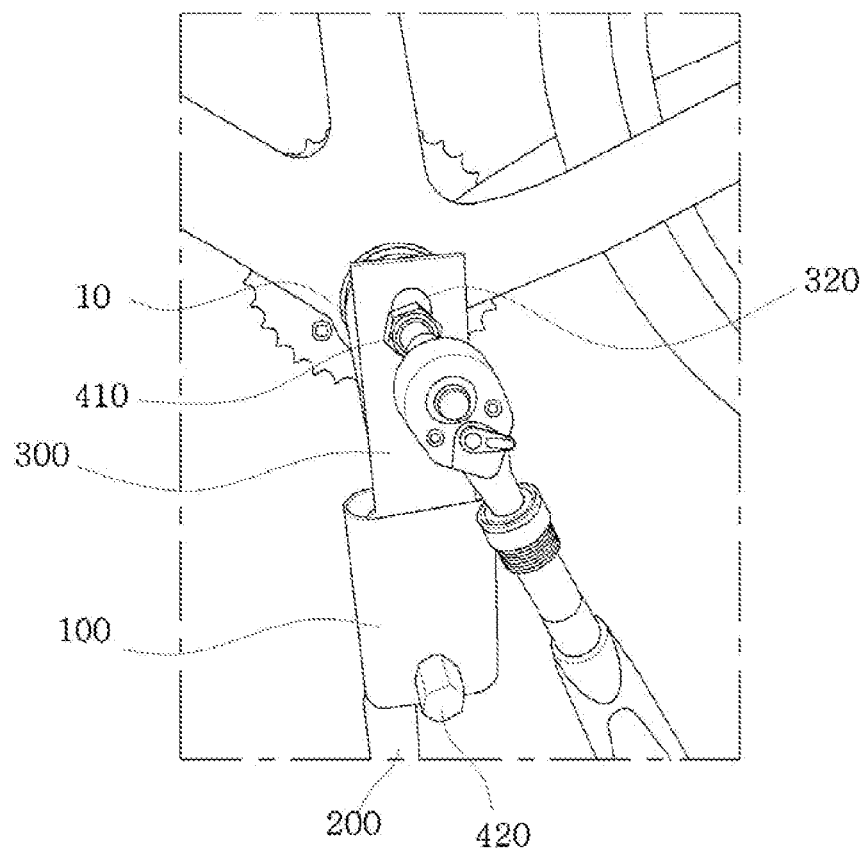

A configuration according to the present invention includes: a main body open through upper and lower portions, the main body having a space formed to receive a crank arm to be inserted; a handle member extending from a lower portion of the main body; a support frame including a fixing part formed on a lower portion thereof and coupled with the upper portion of the main body, and a position adjusting hole that is open through to allow a tool to be passed therethrough and connected to the crank arm, wherein the position adjusting hole enables adjustment of position of the tool in up and down directions; and a support means including a lower support means passed through the main body and fastened to a lower coupling hole of the crank arm, and an upper support means coupled with the position adjustment hole to adjust the positions of the tool.

DETAILED DESCRIPTION

A coupling-assist device according to the present invention includes a main body 100, a handle member 200, a support frame 300, and a support means 400.

The main body 100 is a metal frame through which a space 110 is formed from top to bottom, and to which the handle member 200, the support frame 300, and the support means 400, which are the components of the coupling-assist device, are detachably coupled.

The space 110 serves as an insertion hole into which the crank arm is inserted.

That is, the present invention is configured to allow coupling or separating between the crank arm and the crankshaft such that, the crank arm is passed through the space 110 of the main body 100 and coupled, and an operator is able to couple or separate the crank arm and the crankshaft with a tool such as a hexagon wrench while holding the handle member 200.

The main body 100 includes a front fastening hole 120 and a rear fastening hole 130 formed in the lower front and rear sides, respectively, and the front and rear fastening holes 120 and 130 are firmed to be positioned on the same center line.

The front and rear fastening holes 120 and 130 are formed at positions where their centers coincide with an axis center of the coupling hole formed in the lower portion of the crank arm when the crank arm is coupled with the body 100.

In addition, the front and rear fastening holes 120 and 130 receive a lower support means 420 of the support means 400 that is inserted and fastened therein, such that the main body 100 and the crank arm are coupled with each other.

In this case, the front fastening hole 120 and the rear fastening hole 130 are each formed to have the same diameter as a portion coming into contact with the lower support means 420.

In this case, the lower support means 420 is passed through the front fastening hole 120 and the rear fastening hole 130 to be fastened with a coupling hole formed in the lower portion of the crank arm, thereby fixing the crank arm and the main body 100.

The lower support means 420 includes a fastening head 426 for grip by an operator or attachment with a fastening tool, a screw portion 422 extending from a front end of the fastening head 426 and fastened to the coupling hole of the crank arm, and a fixing protrusion 424 protruding from a front end of the screw portion 422 and inserted and fixed in the rear fastening hole 130 of the main body 100.

At this time, the fixing protrusion 424 is configured such that it is inserted and fixed to the rear fastening hole 130 when the screw portion 422 is completely fastened with the crank arm.

In addition, the lower support means 420 may further include, formed between the fastening head 426 and the screw portion 422, a coupling protrusion 428 that is fitted into the front fastening hole 120.

That is, the front fastening hole 120 is formed to have the same diameter as the coupling protrusion 428, and the rear fastening hole 130 is formed to have the same diameter as the fixing protrusion 424 of the lower support means 420.

In this example, the pedal coupling hole formed in the lower portion of the crank arm is a coupling hole connected to the pedal, and the coupling hole formed in the upper portion is a shaft coupling hole coupled with the crankshaft.

In addition, the main body 100 includes a seating jaw portion 140 formed on the upper surface, to which the support frame 300 is detachably coupled.

The seating jaw portion 140 is preferably formed in a shape corresponding to a fixing part 310 of the support frame 300 to be described below, and may be configured to be coupled with the fixing part 310 by fitting.

However, the present invention is not limited thereto, and the seating jaw portion 140 may be configured to be coupled with the fixing part 310 by various coupling methods according to different designs of the support frame 300 and the main body 100.

In addition, according to the present invention, the main body 100 may be formed of a galvanized steel sheet having a galvanized surface, and preferably made of a steel sheet thinly plated with an alloy such as iron-zinc (Fe—Zn) or phosphorus-zinc (P—Zn) at a thickness of 3 to 5 g/m2 by an electroplating method so as to contain 95% or more of iron or phosphorus.

As described above, according to the present invention, the main body 100 may be configured in circular, elliptical, or polygonal shape including quadrangle, pentagon, hexagon, and so on, and the shape may be implemented in various ways according to designs.

The handle member 200 is formed as a cylindrical pipe and made of the same material as the main body 100, and it is a component that is gripped by the operator when the crank arm and the crankshaft are coupled or separated.

The handle member 200 may be integrally formed on one lower side of the main body 100 by welding, and the like, but embodiments are not limited thereto, and it may be configured to be attachable and detachable.

The handle member 200 may extend from a lower portion of the main body 100 and, during coupling or separating of the crank arm and the crankshaft, the operator is able to perform the work while gripping the handle member 200 positioned lower than the main body 100, thus performing the coupling or separation work of the crank arm and the crankshaft with a small force.

In addition, the handle member 200 of the present invention may be configured such that a friction surface is formed along an outer circumferential surface by knurling, or a rubber packing member may be mounted to prevent slippage when gripped by an operator.

The support frame 300 is formed on an upper portion of the main body 100 to allow a tool for coupling or separating the crank arm and the crankshaft to be passed through and coupled with the coupling hole formed on the upper portion of the crank arm, and includes the fixing part 310 formed as a lower side that is fixed to the seating jaw portion 140, and a position adjustment hole 320 formed on the upper side to receive an upper support means 410 mounted thereto to allow the tool to be passed through while adjusting the position of the tool.

An insertion groove 312 is formed in the fixing part 310 to receive an upper end of the seating jaw portion 140 inserted thereto.

The support frame 300 may be integrally configured with the seating jaw portion 140 of the main body 100, but embodiments are not limited thereto, and it may be formed to be attachable and detachable.

In addition, the position adjustment hole 320 is formed in the form of a long hole such that the upper support means 410 is movable in position in the up and down directions.

The support frame 300 may be inclined by a predetermined angle such that the rear upper portion is brought into close contact with the front upper portion of the crank arm. However, embodiments are not limited thereto, and it may be formed in various ways according to the shape of the crank arm.

Here, the upper support means 410 includes a tool through hole 410a extending through a central portion thereof, to allow a tool such as a hexagonal wrench to enter and coupled with the coupling hole formed on the upper portion of the crank arm are connected to each other.

In addition, the upper support means 410 is provided to be detachable from a fixing nut 412 so as to be movable up and down along the position adjustment hole 320 while being coupled with the support frame 300.

That is, the upper support means 410 includes a flange head 410b including one front end having a greater diameter than the diameter of the position adjustment hole 320 and brought into close contact with the front surface of the support frame 300, and a nut fastening part 410c formed on the other front end opposite the flange head 410b and including a screw thread formed along the outer circumferential surface to be fastened to the fixing nut 412.

The upper support means 410 may be configured to be fastened with the fixing nut 412 with the nut fastening part 410c being passed through the position adjustment hole 320. and accordingly, the upper support means 410 may be movable up and down while being coupled with the position adjustment hole 320.

The support frame 300 as described above may be configured to be coupled with the seating jaw portion 140 formed on the upper portion of the main body 100, and coupled with the coupling hole formed on the upper portion of the crank arm such that the crank arm is fixed to the coupling-assist device.

That is, in the configuration according to the present invention, the main body 100 fixes the lower portion of the crank arm, and the support frame 300 fixes the upper portion of the crank arm, such that the crank arm is coupled with or separated from the crankshaft while being fixed to the coupling-assist device.

Figure 7:
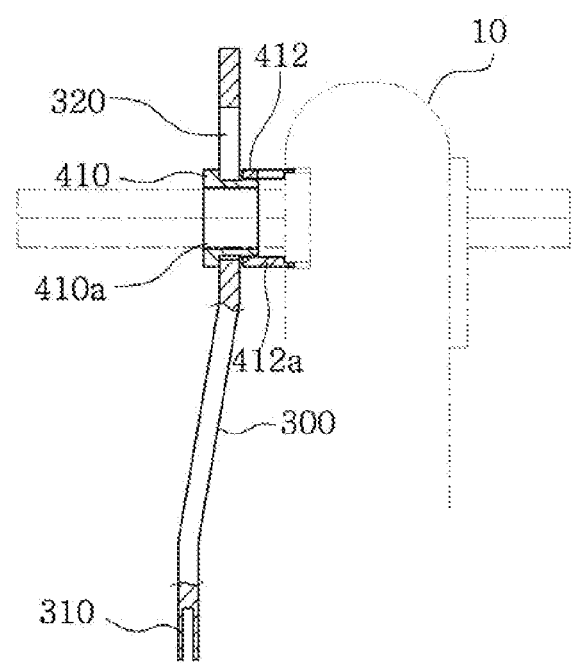
FIG. 7 is a view illustrating another example of the support frame of the coupling-assist device for the bicycle crank arm according to an embodiment of the present invention.
Figure 8:
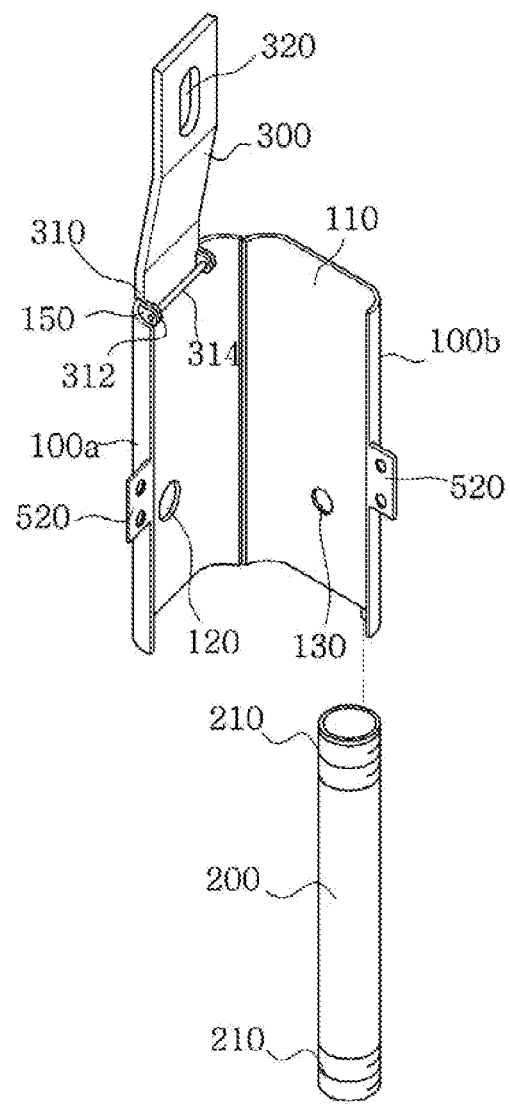
FIGS. 8 to 10 are views illustrating another example of the coupling-assist device for the bicycle crank arm according to an embodiment of the present invention.
Figure 9:
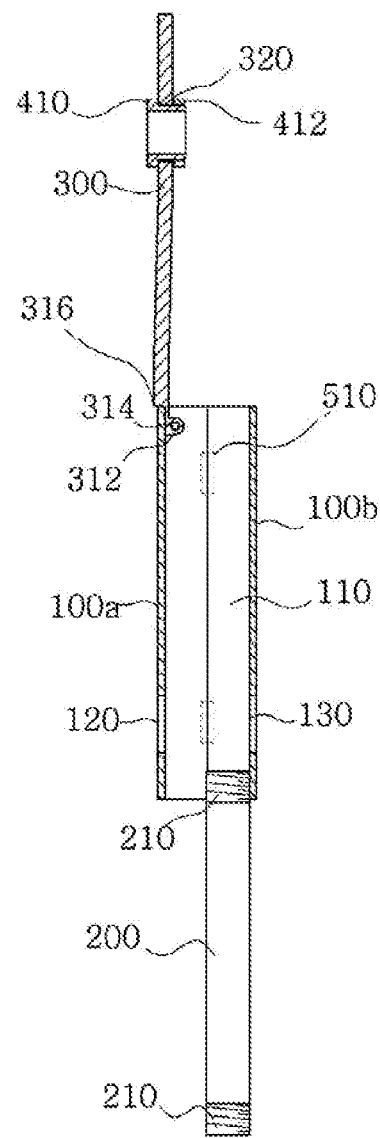
Figure 10:
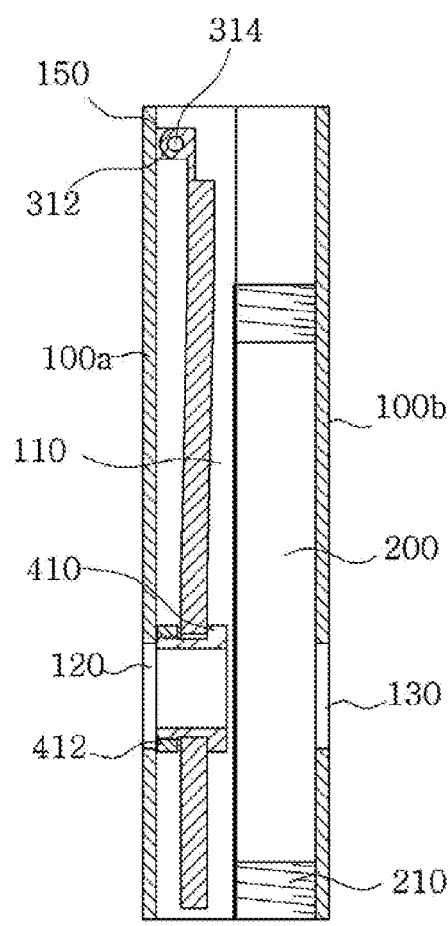

In an example, the support frame 300 may further include a support rib 412a formed on the fixing nut 412 fastened to the lower support means 420 of the support means 400, as illustrated in FIG. 7.

The support rib 412a extends from a front end of the fixing nut 412. A plurality of support ribs 412a may be spaced apart from each other by predetermined and equal intervals along a circumferential surface, and configured to be inserted into close contact with the inner circumferential surface of the coupling hole positioned at the upper portion of the crank arm.

Preferably, the support rib 412a may be configured to be inserted into a gap on the boundary line between the coupling hole and the bearing assembly provided on the inner circumferential surface of the coupling hole.

Accordingly, the axis center of the tool through hole 410a of the upper support means 410 through which the tool is passed, and the axis center of the coupling hole positioned above the crank arm may be coincided with the same axis center without requiring a separate center alignment process, such that it is easier to enter the tool.

Meanwhile, as illustrated in FIGS. 1 to 10, according to the present invention, the coupling-assist device is configured such that the main body 100 is divided into first and second main bodies 100a and 100b, and is rotatable by a rotating operation.

In addition, according to the present invention, the coupling-assist device is configured such that the support frame 300 is rotatably coupled with the first main body 100a among the main bodies divided from the main body 100, and the handle member 200 is separable from the main body 100 by a screw fastening method.

Accordingly, when the coupling-assist device is not in use, the support frame 300 may be rotated toward the space 110 of the main body 100 and placed therein, and the handle member 200 may be separated from the main body 100 and placed in the space 110, to minimize the volume and further maximize portability.

For example, the main body 100 of the coupling-assist device includes the first and second main bodies 100a and 100b formed in shapes corresponding to each other, and the first and second main bodies 100a and 100b may be configured to be rotatably coupled by a predetermined angle by a folding means 510 such as a rotary hinge.

In addition, an opening and closing means 520 for opening and closing the first and second main bodies 100a and 100b may be further provided on the outer surface of the first and second main bodies 100a and 100b, to allow the opening and closing of the space 110.

At this time, the opening and closing means 520 may perform the function of a typical locking device such that, when the coupling-assist device is in use, the opening and closing means 520 may keep the first and second main bodies 100a and 100b in the state of being locked to each other, and when the coupling-assist device is not in use, switch the support frame 300 and the handle member 200 to an unlocked state so that the two can be placed into the space 110.

In addition, in order to allow the support frame 300 to be placed into the space 110, the support frame 300 further includes, formed on the seating jaw portion 140 of the first main body 100a, a rotation support flange 150 to which the fixing part 310 of the support frame 100 is rotatably coupled such that the rotation is allowed only by a predetermined angle and only with respect to the first main body 100a.

In this example, rotation flanges 312 are provided on both sides of the inner side of the fixing part 310 be rotationally coupled with the rotation support flange 150, and a rotation shaft 314 for connecting the rotation flange 312 and the rotation support flange 150 is provided.

In addition, in order to allow the support frame 300 to be rotated only by a certain angle, preferably up to 180°, from the first main body 100a, that is, from the space 110, the support frame 300 may further include a fixing jaw portion 316 formed on an outer surface of the fixing part 310 to be contacted with an end of the seating jaw portion 140.

Meanwhile, reference numeral "10" illustrated in the drawings of the present invention indicates the crank arm described in the detailed description of the present invention.

SEQUENCE LIST FREE TEXT

| 100: main body | 110: space |
| 120: front fastening hole | 130: rear fastening hole |
| 140: seating jaw portion | 150: rotating support flange |
| 200: handle member | 300: support frame |
| 310: fixing part | 320: position adjustment hole |
| 400: support means | 410: upper support means |
| 420: lower support means | 510: folding means |
| 520: opening and closing means | |

The invention claimed is:

1. A coupling-assist device for a bicycle crank arm comprising:
   a main body open through upper and lower portions, the main body having a space formed to receive a crank arm to be inserted;
   a handle member extending from a lower portion of the main body;
   a support frame including a fixing part formed on a lower portion thereof and coupled with the upper portion of the main body, and a position adjusting hole that is open through to allow a tool to be passed therethrough and connected to the crank arm, wherein the position adjusting hole enables adjustment of position of the tool in up and down directions; and
   a support means including a lower support means passed through the main body and fastened to a lower coupling hole of the crank arm, and an upper support means coupled with the position adjustment hole to adjust the positions of the tool.

2. The coupling-assist device according to claim 1, wherein the main body further includes:
   a sealing jaw portion to which the fixing part is coupled;
   a front fastening hole through which the lower support means is passed through; and
   a rear fastening hole into which an end of the lower support means is inserted and fixed.

3. The coupling-assist device according to claim 2, wherein the lower support means includes:
   a fastening head to be coupled with a fastening tool;
   a screw portion extending from a front end of the fastening head and fastened to a coupling hole of a crank arm while being passed through the front fastening hole;
   a fixing protrusion protruding from a front end of the screw portion and inserted into and fixed to the rear fastening hole; and
   a coupling protrusion formed between the fastening head and the screw portion, and fitted into the front fastening hole.

4. The coupling-assist device according to claim 1, wherein the upper support means includes:
   a flange head formed at one front end and having a diameter greater than a diameter of the position adjustment hole, for close contact with a front surface of the support frame;
   a nut fastening part formed on other front end and having a thread formed along an outer circumferential surface; and
   a fixing nut fastened to the nut fastening part.

5. The coupling-assist device according to claim 1, wherein the main body is divided into first and second main bodies, which are coupled to open and close with each other.

6. The coupling-assist device according to claim 1, wherein the handle member and the support frame are configured to be placed into the main body.

* * * * *